United States Patent [19]
Kondo

[11] Patent Number: 4,530,550
[45] Date of Patent: Jul. 23, 1985

[54] POWER SUPPLY UNIT FOR ELECTRONIC FLASH

[75] Inventor: Isao Kondo, Hachioji, Japan

[73] Assignee: Olympus Optical Company Ltd., Tokyo, Japan

[21] Appl. No.: 509,945

[22] Filed: Jul. 1, 1983

[30] Foreign Application Priority Data

| | | | |
|---|---|---|---|
| Sep. 13, 1982 | [JP] | Japan | 57-159227 |
| Jan. 20, 1983 | [JP] | Japan | 58-7146[U] |
| Jan. 27, 1983 | [JP] | Japan | 58-10190[U] |
| Feb. 4, 1983 | [JP] | Japan | 58-17103 |

[51] Int. Cl.[3] .......... H05B 41/32; H02M 3/06
[52] U.S. Cl. .......... 315/241 P; 315/171; 315/176; 315/160; 320/1
[58] Field of Search .......... 315/241 P, 175, 176, 315/173, 171, 160; 320/1; 354/127.1, 145.1

[56] References Cited

U.S. PATENT DOCUMENTS

| | | | |
|---|---|---|---|
| 3,414,765 | 12/1968 | McKnight et al. | 315/176 X |
| 4,039,898 | 8/1977 | Iwata et al. | 315/241 P |
| 4,251,753 | 2/1981 | Kondo | 315/241 P X |
| 4,396,870 | 8/1983 | Ikeda | 315/241 P |
| 4,430,602 | 2/1984 | Ohmori | 315/241 P |

FOREIGN PATENT DOCUMENTS

| | | |
|---|---|---|
| 3960560 | 4/1969 | Japan . |
| 42109839 | 8/1972 | Japan . |
| 4397514 | 4/1973 | Japan . |

*Primary Examiner*—David K. Moore
*Assistant Examiner*—Vincent DeLuca
*Attorney, Agent, or Firm*—Louis Weinstein

[57] ABSTRACT

A power supply unit for electronic flash includes a plurality of charging units connected to a main capacitor of an electronic flash through diodes which prevent a reverse current flow. Each charging unit includes a d.c. source and a booster converter. An efficient utilization of the source battery is attained by reducing loading upon each source. The use of components of reduced capacity enables a reduction in the size of the overall unit. A single power switch enables a simultaneous initiation of the charging of the main capacitor by all of the charging units. When the main capacitor is charged to a given value, disable means are simultaneously operated in response to an output from charging voltage detecting means, thus simultaneously ceasing the charging operation of the charging units.

25 Claims, 9 Drawing Figures

POWER SUPPLY UNIT FOR ELECTRONIC FLASH

BACKGROUND OF THE INVENTION

The invention relates to a power supply unit for electronic flash, and more particularly, to such unit including a plurality of DC-DC converters which efficiently feed a main capacitor of a large size electronic flash.

As is well recognized, an electronic flash is usually constructed as a portable unit to enable a flash photography outdoors, and is hence fed from a battery which is either contained within or externally connected to the electronic flash. A battery has an electromotive force of a magnitude which is insufficient to charge the main capacitor to a desired level, and hence a booster which converts the low voltage output from the battery to a higher level is normally provided as either an internal or an external component of the electronic flash.

FIG. 1 shows one example of a conventional power supply unit for electronic flash. As shown, the unit includes a d.c. source E1 comprising a plurality of series connected dry cells to provide a given voltage. A power switch SW1 is connected in series with the source E1 and is connected, when closed, to feed a DC-DC converter $DCC_0$ which initiates a self-excited oscillation to convert the low voltage output from the source E1 to a higher level. The converter $DCC_0$ includes a step-up transformer T1 having a primary and a secondary winding P and S. An oscillation transistor Q1 of PNP type has its base connected to one end of the secondary winding S, and has its collector connected through resistor R1 to the base of a main transistor Q2 of NPN type. A series combination of resistor R2 and capacitor C2 is connected across the source E1 through the switch SW1. A rectifier diode D1 has its anode connected to the other end of the secondary winding S. The base of the transistor Q1 is connected to the junction between the resistor R2 and capacitor C2, and has its emitter connected to a common line $l_0$ which is connected through the power switch SW1 to the positive terminal of the source E1. The emitter of the main transistor Q2 is connected to the negative terminal of the source E1. The primary winding P has its one end connected to the common line $l_0$ and its other end connected to the collector of the main transistor Q2.

A supply line $l_1$ is connected to the cathode of the diode D1 to feed an operating voltage for an associated electronic flash. The lines $l_1$ and $l_0$ are connected to a pair of output terminals J1 and J2 of the power supply unit, across which is connected a flashlight emission circuit $FIC_1$ including a main capacitor CM1. The flashlight emission circuit $FIC_1$ operates to generate flashlight for taking a picture, by causing a discharge through a flash discharge tube FL1 of the main capacitor CM1 which is previously charged to a high voltage by the power supply unit. The emission circuit $FIC_1$ comprises a trigger switch SW2, a trigger capacitor C1, and a trigger transformer T2, in addition to the flash discharge tube FL1 and the main capacitor CM1. Specifically, the main capacitor CM1 is connected across the pair of output terminals J1 and J2. Also connected across the output terminals are a series circuit including a resistor R3 and a neon lamp Nel which indicates the completion of a charging operation, and another series circuit including a resistor R4 and the trigger switch SW2. Also the flash discharge tube FL1 is connected across the output terminals. The junction between the resistor R4 and the trigger switch SW2 is connected to one end of the trigger capacitor C1, the other end of which is connected to one end of a primary winding of the transformer T2. The other end of the primary winding is connected to the line $l_0$ and is also connected to one end of the secondary winding, the other end of which is connected to a trigger electrode FL1*a* of the flash discharge tube FL1.

In operation, when the power switch SW1 is closed, the oscillation transistor Q1 begins its oscillating operation as it is fed from the source E1, thus activating the converter $DCC_0$. Accordingly, the combination of the step-up transformer T1 and the diode D1 develops a high d.c. voltage across the output terminals J1 and J2, which charges the main capacitor CM1 and the trigger capacitor C1 in a given manner. As a shutter release of a photographic camera is operated, the trigger circuit is activated in synchronism therewith, whereby the main capacitor CM1 discharges through the discharge tube FL1 to emit flashlight.

The power supply unit shown in FIG. 1 including the converter $DCC_0$ is designed to be assembled into an electronic flash. However, for use with an electronic flash of a relatively large size, an arrangement as shown in FIGS. 2 and 3 may be used which permits external power supply unit or units to be used in addition to the internally housed power supply unit.

An example of a conventional electronic flash of a relatively large size ST is shown in FIG. 2, and essentially comprises an emission control circuit $A_0$ which is activated by the trigger switch SW2 to cause the emission of flashlight from the flash discharge tube FL1, an emission adjusting circuit $B_0$ which is adapted to determine reflected light from an object being photographed when the flashlight is emitted to cease the emission of flashlight from the discharge tube FL1 by controlling the operation of the emission control circuit $A_0$, an external control circuit $E_0$ and the main capacitor CM1. These circuits and the main capacitor CM1 are connected across the output terminals J1 and J2 of the power supply unit as shown, and an internally housed power supply unit $C_0$ which is constructed in the a manner similar to that shown in FIG. 1 is connected across these output terminals through the power switch SW1. An external power supply unit $D_0$ may be connected through electrical cords $F_0$ with the electronic flash ST which consists of the combination of the flashlight emission circuit and the internally housed power supply unit, as illustrated in FIGS. 2 and 3. As shown in FIG. 3, the external power supply unit $D_0$ includes a plurality of batteries $D_{01}$ each having an increased capacity and a booster circuit $D_{02}$ having a DC-DC converter. The output terminals of the unit $D_0$ are adapted for connection with the output terminals J1, J2 of the power supply unit as shown in FIG. 2. When the external unit $D_0$ is used, the power switch SW1 is opened to disable the internal unit $C_0$.

A portable electronic flash of a large size which may be used by a press photographer includes a main capacitor of an increased capacity so that a higher guide number can be used. To permit a rapid charging of such main capacitor, the electronic flash is associated with a power supply unit capable of supplying an increased output. A conventional power supply unit which is designed for use with an electronic flash of a large size has a circuit arrangement as illustrated in FIGS. 1 to 3 in a manner similar to that used for an electronic flash of a small size. This involves the following disadvantages:

(1) An increased current drain from the battery causes a rapid reduction in the discharge rate of the battery, preventing an efficient use of the battery.

FIG. 4 graphically shows the relationship between the discharge current and the discharge capacity of a nickel-cadmium battery, or a change in the discharge rate. It will be seen that the greater the discharge current, the less the discharge capacity. In this Figure, the unit "C" used to denote the discharge current represents a nominal capacity (one hour rate). Specifically, considering a nickel-cadmium battery having a nominal capacity of 500 mAh, when the battery is caused to discharge continuously with a current of 50 mA which is equal to one-tenth the nominal capacity (one hour rate), this is referred to as 0.1 C discharge. A corresponding discharge capacity is designated as 100%. Accordingly, 2.0 C, for example, means a discharge with a current which is equal to twice the nominal capacity (one hour rate). The electrical capacity drawn from the battery at a variety of values of discharge current is shown as a discharge capacity (in percentage) in FIG. 4 as compared with 0.1 C discharge.

It will be seen from FIG. 4 that when the discharge current is equal to 3.0 C, the discharge capacity will be reduced to a value slightly less than 80% of the discharge current for 0.1 C, and the discharge capacity will be reduced to a value slightly greater than 70% for the discharge current of 4.0 C. A conventional power supply unit for use with an electronic flash of a large scale is usually operated at discharge current of 10 to 20 C. Accordingly, the discharge capacity will be on the order of one-third or less than that available in the 0.1 C discharge, resulting in a considerable reduction in the utilization efficiency of the battery. The discharge current from the battery on the order of 10 to 20 C is required as a result of an increased current flow through the primary side of the DC-DC converter in order to charge the main capacitor with an increased magnitude of current to thereby reduce the required charging time. The greater the discharge current from the battery and the longer the duration of the discharge, the less the discharge capacity will be, due to the utilization of the active material in the plates of the battery at a reduced efficiency, increasing the internal loss.

(2) The overall size of the power supply unit increases, presenting an inconvenience in its portable use.

A conventional power supply unit for use with an electronic flash of a large size has a circuit arrangement as shown in FIG. 1. Accordingly, components used in the circuit arrangement must be of sizes which are commensurate with the capacity of the main capacitor CM1 to be charged. In particular, the transistor Q2 which represents the main element in the oscillating operation must pass a current flow through the primary winding of the step-up transformer T1 and hence must have an increased capacity. It is associated with a heat dissipating plate of an increased size to accommodate for an increased amount of heat produced during the self-excited oscillation. In order to avoid adverse influence of the heat produced by the transistor Q2, a certain space must be secured between the transistor and its peripheral circuit in actual implementation.

A conventional power supply unit for use with an electronic flash of a large size is generally designed to operate with a supply voltage of 12 V (1.5 V×8) which is twice the operating voltage of 6 V (1.5 V×4) used for a normal electronic flash of a small size. As the operating voltage is stepped up, a greater current tends to flow through the primary size of the converter. Unless the magnitude of the current is suppressed to a degree, the heat produced by the transistor will be excessively high, causing an overloading and a reduced efficiency of the battery. To accommodate for this, in the prior art power supply unit designed for use with an electronic flash of a large size, the primary winding P of the step-up transformer T1 has an increased number of turns, with a corresponding increase in the number of turns of the secondary winding, thus increasing the resistance of the windings in an attempt to suppress the current drain from the source E1 in order to prevent a reduction in the efficiency. This resulted in an increased size of the step-up transformer T1 and hence the power supply unit.

SUMMARY OF THE INVENTION

It is an object of the invention to provide a power supply unit for an electronic flash including a plurality of charging units each comprising a d.c. source and a boosterconverter and wherein a diode which prevents a reverse current flow is interposed between each of the charging units and a main capacitor of the electronic flash, thus permitting a separate charging of the main capacitor by an individual charging unit.

It is another object of the invention to provide a power supply unit of the type mentioned above and including a power switch which enables all of the charging units to be simultaneously activated, thus enabling the charging operation of the main capacitor by the individual charging units to be initiated concurrently in one operation.

It is a further object of the invention to provide a power supply unit of the type mentioned above, and further including means for detecting the voltage to which the main capacitor has been charged and deactivate means provided in each of the charging units, thus enabling the charging operation of the main capacitor by the individual charging units to be simultaneously interrupted by operating all of the deactivate means simultaneously in response to an output from the detecting means which indicates that the voltage across the main capacitor has reached a given value.

In accordance with the invention, a plurality of charging units are each capable of charging a main capacitor separately. This reduces loading on the d.c. source of each of the charging units, thus attaining a substantial improvement in the utilization efficiency of the battery. In this manner, a reduction in the length of time required to charge a large size electronic flash is achieved as well as an increase in the number of available emissions to be simultaneously achieved while using batteries of the same capacity as used in the prior art.

Also, the discharge current from the d.c. source can be reduced and the operating voltage of the DC-DC converter can be established at the same level as that used in a small size electronic flash of the prior art. Accordingly, components used in a conventional small size electronic flash which are relatively small, readily available and inexpensive can be directly used to construct the power supply unit of the invention, which can therefore be obtained at a reduced cost.

The provision of a plurality of DC-DC converters means that heat sources are also divided and the load in each of the heat sources is reduced, thus reducing the entire amount of heat generated, as compared with the prior art. Consequently, a heat dissipating plate and the space required for heat dissipation can be reduced or can be dispensed with, allowing a greater latitude in the layout of parts. This, combined with the small size of parts, allows a substantial reduction in the overall size of the power supply unit. The reduced load on the individual parts contributes to an improved reliability of the entire power supply unit.

The single power switch may be operated to initiate a simultaneous charging of the main capacitor by the plurality of charging units. When the main capacitor is charged to a given value, the charging operation of the plurality of charging units is interrupted simultaneously, thus avoiding a wasteful dissipation of batteries and allowing a stabilization of the output voltage.

It is to be noted that the power supply unit of the invention can be internally housed within an electronic flash, or may be constructed as a separate unit while eliminating the need for adjustment.

DESCRIPTION OF PREFERRED EMBODIMENTS

Figure 5:
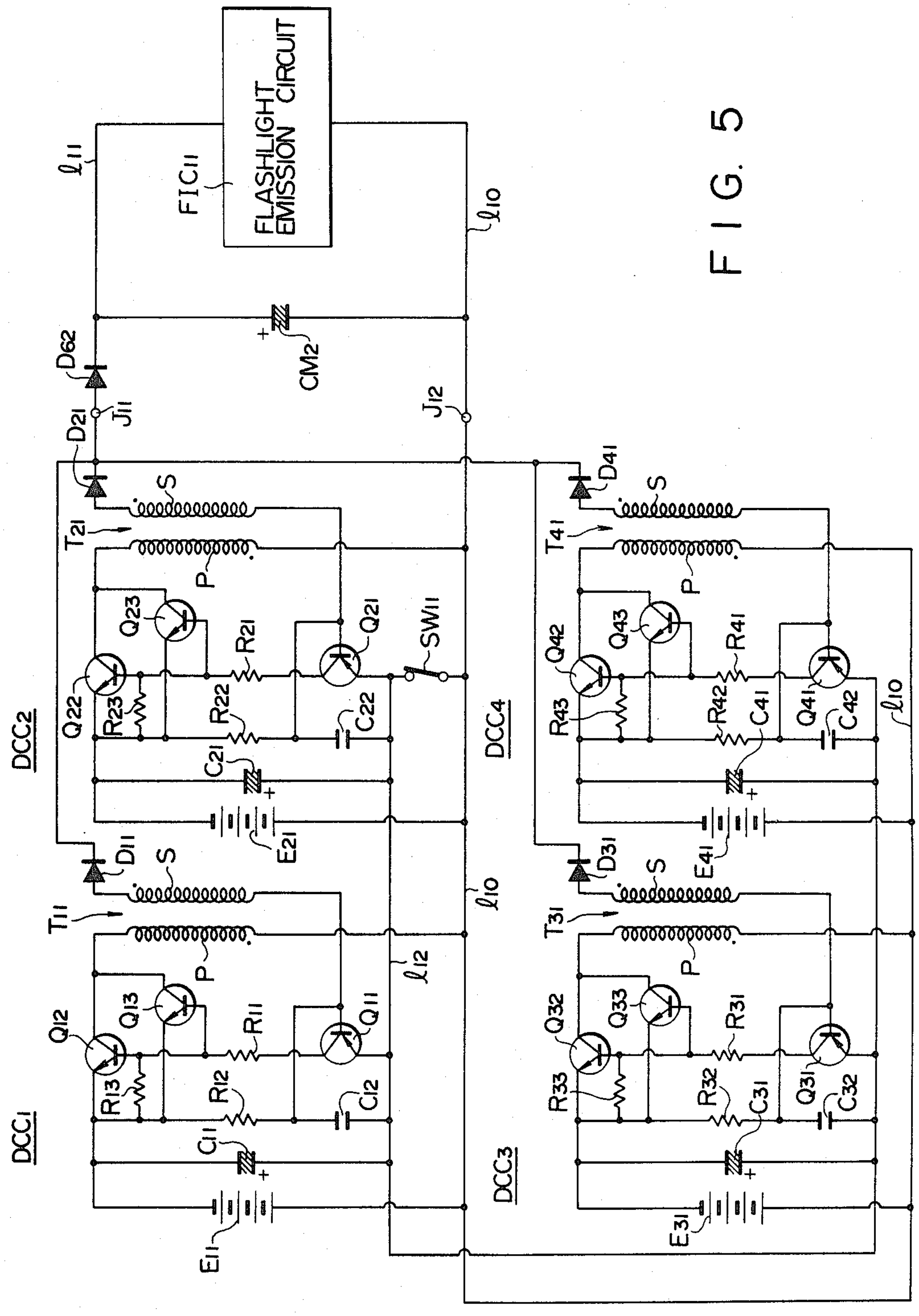
FIG. 5 is a circuit diagram of a power supply unit for electronic flash according to one embodiment of the invention.

FIG. 5 is a circuit diagram of a power supply unit for electronic flash according to one embodiment of the invention. The power supply unit includes four charging units, employing a total of sixteen nickel-cadmium batteries of UM-3 type. Sixteen cells are arranged into groups, each group containing four cells connected in series, thus defining four d.c. sources E11, E21, E31 and E41, each of which is connected to a corresponding one of four DC-DC converters $DCC_1$ to $DCC_4$, respectively, to drive the latter. Each of the converters $DCC_1$ to $DCC_4$ can be simultaneously activated or deactivated by turning a power switch SW11 on and off, which is connected between a common line $l_{10}$ and a supply line $l_{12}$.

The converters $DCC_1$ to $DCC_4$ are identical in every aspect to each other, and hence one of them, converter $DCC_1$, will be described. It comprises a step-up transformer T11, an oscillation transistor Q11 of PNP type, main transistors Q12 and Q13 of NPN type, resistors R11 to R13, a current superimposing capacitor C11, a back electromotive force absorbing capacitor C12 and a rectifier diode D11. The transformer T11 has a primary winding P, one end of which is connected to the common line $l_{10}$ and the other end of which is connected to the collectors of the main transistors Q12 and Q13. The transformer has a secondary winding S, one end of which is connected to the base of the oscillation transistor Q11 and the other end of which is connected to the anode of the rectifier diode D11. The transistor Q11 has its emitter connected to the line $l_{12}$ and its collector connected through resistor R11 to the bases of the transistors Q12 and Q13. The base of the transistor Q11 is also connected through resistor R12 to the negative terminal of the d.c. source E11 and also connected to the line $l_{12}$ through the capacitor C12. The main transistors Q12 and Q13 have their emitters connected together and connected to the negative terminal of the d.c. source E11, and a resistor R13 is connected across their base and emitter. The current superimposing capacitor C11 is connected between the negative terminal of the source E11 and the line $l_{12}$. The cathode of the diode D11 is connected to the output terminal J11 of the power supply unit.

The remaining converters $DCC_2$ to $DCC_4$ are similarly constructed as the converter $DCC_1$, and corresponding parts are designated by like reference characters in which numerals are increased by 10, 20 and 30, respectively.

The common line $l_{10}$ is connected to the output terminal J12 of the power supply unit. Connected across the output terminals J11 and J12 are a main capacitor CM2 and a flashlight emission circuit $FIC_{11}$ of an electronic flash. When an electronic flash including the main capacitor CM2 and the flashlight emission circuit $FIC_{11}$, which is similarly constructed as the flashlight emission circuit $FIC_1$ shown in FIG. 1, for example, is connected across the output terminals J11 and J12 of the power supply unit, the output terminal J11 is connected through a diode D62, which is provided to prevent electric shock, to a supply line $l_{11}$ of the electronic flash while the other output terminal J12 is connected to the common line $l_{10}$.

In operation, when the power switch SW11 is open, none of the converters $DCC_1$ to $DCC_4$ is fed, and hence the power supply unit remains quiescent. When the power switch SW11 is closed, the supply line $l_{12}$ is connected to the common line $l_{10}$, whereupon the converters $DCC_1$ to $DCC_4$ are fed, initiating their operation. The operation of each converter is identical, and hence the operation of only the converter $DCC_1$ will be described. When a current flow occurs through the emitter-base path of the oscillation transistor Q11 and resistor R12, the transistor Q11 is turned on. At the same time, a charging current flows through the capacitor C11, which is charged with its plate connected to the line $l_{12}$ positive. As the transistor Q11 is turned on, the main transistors Q12 and Q13 are both turned on, whereby the sum of the current flow from the source E11 and from the capacitor C11 passes through the primary winding P of the step-up transformer T11.

In response to the current flow through the primary winding, a high voltage is induced across the secondary winding S of the transformer T11, and a positive feedback current flows through the main capacitor CM2 to increase the current flow through the primary winding. When the current flow through the primary winding increases to a given value and then begins to decrease, the back electromotive force developed across the secondary winding S is applied to the base of the oscillation transistor Q11, thus turning it off. It is to be noted that the back electromotive force developed across the secondary winding S is buffered by the capacitor C12, thus preventing the transistor Q11 from being destroyed. As the transistor Q11 is turned off, the main transistors Q12 and Q13 are also turned off, and the energy stored in the primary winding P develops a back electromotive force. Upon occurrence of the back electromotive force, an LC oscillation circuit is formed by the winding and various distributed capacitances formed between the winding and the common line, thus initiating an oscillating operation. The oscillating voltage is transmitted from the primary winding P to the secondary winding S, and during a cycle in which the transistor Q11 is forwardly biased, the transistor Q11 is turned on again as are the transistors Q12 and Q13. This process is repeated to sustain the oscillation.

The remaining DC-DC converters $DCC_2$ to $DCC_4$ are also subject to self-excited oscillation in the same manner as the converter $DCC_1$. The self-excited oscillation of v. these converters produce a positive feedback current through the rectifier diodes D11, D21, D31 and D41 to the main capacitor CM2, thus charging it. A circulating current between the converters $DCC_1$ to $DCC_4$ is prevented by the action of the diodes D11 to D41 which prevent a reverse flow if the oscillations in the individual converters $DCC_1$ to $DCC_4$ are phase displaced from each other.

Figure 4:
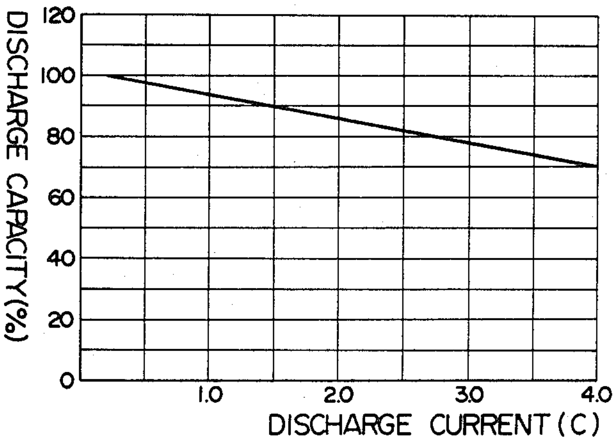
FIG. 4 graphically shows the relationship between the discharge current and the discharge capacity of a battery.

In the power supply unit according to the present embodiment, the charging current to the main capacitor CM2 is shared by four charging units, each of which needs to bear one-fourth the entire load. A charging current from the power supply unit decreases gradually as the main capacitor becomes charged. Assuming that a conventional apparatus shown in FIG. 1 required an average current drain from the battery on the order of 5 to 10 C to charge the main capacitor to a level which is sufficient to allow a single emission of flashlight, the current drain will be reduced to the order of 1.3 to 2.5 C in the arrangement of the invention. By comparing the discharge capacity for the respective discharge currents, it will be seen from FIG. 4, by extending the characteristic curve depicted therein, that the discharge current will be on the order of 20 to 30% for the former and on the order of 70 to 80% for the latter. Accordingly, if batteries of a same capacity are used, it follows that the present embodiment is capable of performing as many emissions as twice that achievable with the conventional arrangement.

Figure 6:
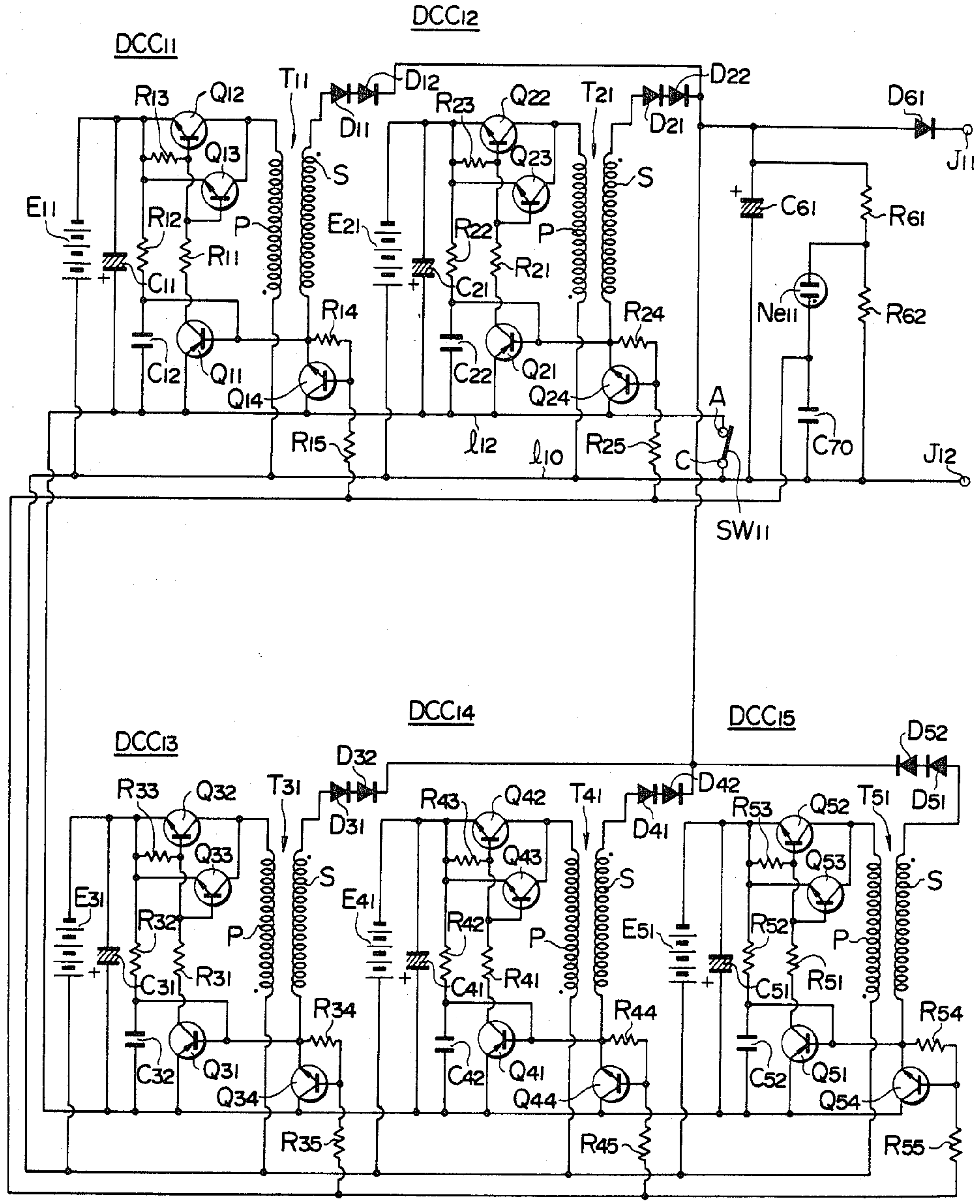
FIG. 6 is a circuit diagram of a power supply unit for electronic flash according to another embodiment of the invention.

FIG. 6 is a circuit diagram of a power supply unit for electronic flash according to another embodiment of the invention. The power supply unit of this embodiment is formed as an external power supply unit including five charging units, utilizing a total of twenty nickel-cadmium batteries of UM-3 type. These cells are arranged into five groups each comprising four cells connected in series, thus forming five d.c. sources E11, E21, E31, F41 and E51. Each of these sources are connected to one of five DC-DC converters $DCC_{11}$ to $DCC_{15}$, respectively, which are constructed in an identical manner, thus driving each converter separately. Each of the converters $DCC_{11}$ to $DCC_{15}$ is constructed in substantially the similar manner as the converters $DCC_1$ to $DCC_4$ shown in FIG. 5.

Specifically, considering the converter $DCC_{11}$ as a typical example of the converters $DCC_{11}$ to $DCC_{15}$, it comprises a step-up transformer T11, an oscillation transistor Q11 of PNP type, main transistors Q12 and Q13 of NPN type, resistors R11 to R13, a current superimposing capacitor C11, a capacitor C12 which is provided to absorb a back electromotive force, and a pair of rectifier diodes D11 and D12 connected in series. The transformer T11 has a primary winding P, one end of which is connected to the common line $l_{10}$ and the other end of which is connected to the collector of the main transistors Q12 and Q13. The secondary winding S of the transformer has its one end connected to the base of the oscillation transistor Q11 and its other end connected to the anode of the diode D11. In the present embodiment, the pair of diodes D11 and D12 are connected in series, but as many diodes as desired may be connected in series. To illustrate, if a diode capable of withstanding 1500 V is used and the circuit requires a voltage level of 2500 V, two such diodes are used so that 3000 V>2500 V. Obviously, a single diode may be used if it satisfies the circuit voltage requirement. The oscillation transistor Q11 has its emitter connected to the line $l_{12}$ and its collector connected through the resistor R11 to the bases of the main transistors Q12 and Q13. The base of the transistor Q11 is connected through resistor R12 to the negative terminal of the d.c. source E11 and is also connected through capacitor C12 to the line $l_{12}$. The main transistors Q12 and Q13 have their emitters connected to the negative terminal of the source E11, and have resistor R13 connected across their bases and emitters. The capacitor C11 is connected between the negative terminal of the source E11 and the line $l_{12}$. The cathode of the diode D12 is connected through diode D61 to one of output terminals, J11.

The remaining converters $DCC_{12}$ to $DCC_{15}$ are constructed in quite the identical manner as the converter $DCC_{11}$ mentioned above, and their parts are designated by like reference characters and numerals, to which figures 10, 20, 30 and 40 are added, without repeating their description.

The present embodiment includes means which interrupt the operation of the converters as well as means which stabilizes the output. Specifically, in order to cease the operation of each of the converters $DCC_{11}$ to $DCC_{15}$ automatically, each of these converters is associated with a switching transistor Q14, Q24, Q34, Q44 or Q54, and resistors R14, R15; R24, R25; R34, R35; R44, R45; and R54, R55, respectively. Connected across a pair of output terminals J11, J12, to which the outputs from the converters $DCC_{11}$ to $DCC_{15}$ are connected in parallel, are an output voltage monitoring capacitor C61, voltage detecting neon lamp Nell, resistors R61 and R62, noise eliminating capacitor C70 and diode D61.

Describing such means in more detail, each of the switching transistors Q14 to Q54 is of NPN type, and has its collector connected to the supply line $l_{12}$, and its emitter connected to one end of the secondary winding S of the step-up transformer T11, T21, T31, T41 or T51, respectively. The base of each transistor is connected to the emitter thereof through resistor R14, R24, R34, R44 or R54, respectively, and is also connected through resistor R15, R25, R35, R45 or R55 to one end of the neon lamp Nell. The capacitor C70 is connected between this end of the lamp Nell and the common line $l_{10}$ in order to eliminate noise. The cathode of the rectifier diode D12, D22, D32, D42 and D52, which represents the output of the respective converters $DCC_{11}$ to $DCC_{15}$ are connected to each other and is connected to one end of the capacitor C61 and also connected through diode D61 to the output terminal J11.

The capacitor C61 has its other end connected to the common line $l_{10}$ so as to be charged to the same level as the main capacitor CM2 (see FIG. 5) of the electronic flash which is connected across the output terminals J11 and J12. The capacitor C61 is shunted by a voltage divider comprising a series combination of resistors R61 and R62, with the junction between these resistors being connected to the other end of the neon lamp Nell. When a fraction of the voltage to which the capacitor C61 is charged which is developed at the junction exceeds a trigger level at which the emission of light from the neon lamp Nell is initiated, the capacitor C61 discharges through resistor R61 and neon lamp Nell into the bases of the switching transistors Q14 to Q54, thus turning on each of these transistors. Thereupon, the oscillation transistors Q11 to Q51 are turned off, thus ceasing the operation of the converters $DCC_{11}$ to $DCC_{15}$. The capacitor C61 has a capacitance which is very small as compared with that of the main capacitor CM2 (see FIG. 5), and accordingly the capacitor C61 is fully discharged within a short interval to deenergize the neon lamp Nell, whereupon the converters $DCC_{11}$ to $DCC_{15}$ reinitiate their operation to charge the capacitor C61. In this manner, the capacitor C61 undergoes a repeated charging and discharge, and establishes a substantially constant voltage across the main capacitor CM2, by cooperating with the neon lamp Nell and the transistors Q14 to Q54, as will be further described later.

A power switch SW11 is connected across the supply line $l_{12}$ and the common line $l_{10}$, and has a movable contact C which is connected to the line $l_{10}$ and a fixed contact A which is connected to the line $l_{12}$. The common line $l_{10}$ is connected to the output terminal J12, and as shown in FIG. 5, the main capacitor CM2 and the flashlight emission circuit $FIC_{11}$ are connected across the output terminals J11 and J12 through the diode D62.

In operation, when the power switch SW11 is open, the converters $DCC_{11}$ to $DCC_{15}$ are not fed with power, and hence the power supply unit remains quiescent. When the power switch SW11 is closed, the supply line $l_{12}$ is connected to the common line $l_{10}$, thus feeding the converters $DCC_{11}$ to $DCC_{15}$, allowing them to initiate operation. Each of the converters operates in an identical manner, and hence the operation of only the converter $DCC_{11}$ will be described as a typical example. Initially, a bias current begins to flow through the base of the oscillation transistor Q11 through resistor R12. This current is amplified and is fed through the emitter-collector path of the transistor Q11 and resistor R11 into the bases of the main transistors Q12 and Q13. The resistor R11 represents a load resistor on the transistor Q11, and its resistance is determined in consideration of the permissible power Pc of the transistor Q11. The main transistors Q12 and Q13 are connected in parallel to each other, operating to share an equal amount of collector current. It is to be noted that the pair of main transistors Q12 and Q13 may be replaced by a single transistor having an increased capacity. It will be noted that the collector current of the main transistors Q12 and Q13 passes through the primary winding P of the step-up transformer T11, thus inducing a current flow through the secondary winding S which is inversely proportional to the step-up ratio. The resulting current passes through the rectifier diodes D11 and D12 in series into the capacitor C61 and the main capacitor CM2, and then returns to the emitter of the oscillation transistor Q11 through the common line $l_{10}$. The current then passes through the emitter-base path of the transistor Q11 to return to said one end of the secondary winding S of the transformer T11. The current flow through the emitter-base path of the oscillation transistor Q11 causes a further increase in the collector current thereof, which in turn causes an increased collector current through the transistors Q12 and Q13, which in turn causes an increase in the charging current to the capacitors CM2 and C61. In this manner, a maximum current is supplied from the battery or source E11 through the primary winding P of the transformer T11 until a saturation point is reached.

When the saturation point is reached, the electromagnetic coupling between the primary and the secondary winding no longer exists, and accordingly the current flow through the secondary winding S rapidly reduces. Thereupon the loop including the transistor Q11, resistor R11, transistors Q12, Q13 and the primary winding P of the transformer T11 is no longer driven with a positive feedback, and is thus cut off. When the transistors Q11 to Q13 are cut off, neither capacitor C61 nor main capacitor CM2 is fed with current. On the other hand, upon cut-off, the energy which has been stored in the primary winding P of the transformer T11 develops an induced voltage. A damped oscillating LC current then flows through the winding toward an equivalent capacitance within the winding and stray capacitances formed with peripheral circuits and the common line. The oscillating current develops a current flow through the secondary winding S in a sense to increase the base current of the transistor Q11, which turns the transistor Q11 on, thus initiating another cycle. The circuit oscillation is sustained in this manner.

The remaining converters $DCC_{12}$ to $DCC_{15}$ sustain an oscillating operation in the similar manner, thus rapidly charging the main capacitor CM2 and the voltage monitoring capacitor C61. Because the capacitors CM2 and C61 are connected in parallel with each other, with diodes D61 and D62 interposed therebetween, it may be assumed that the capacitors are charged to substantially the same voltage level inasmuch as the difference corresponds to a forward drop across the diodes D61 and D62. In this manner, the voltage across the main capacitor CM2 can be monitored by the capacitor C61.

The voltage across the capacitor C61 is divided by the resistors R61 and R62 to be applied across the neon lamp Nell. When the voltage across the lamp Nell reaches a given value, it is illuminated and the resulting current is applied through each of resistors R15 to R55 to the base of each of switching transistors Q14 to Q54, respectively. The transistors Q14 to Q54 are rendered conductive in this manner, short-circuiting the emitter-base path of the respective oscillation transistors Q11 to Q51, which are then cut off to terminate their oscillation simultaneously. Accordingly, the respective converters $DCC_{11}$ to $DCC_{15}$ cease to operate at the same time. When these converters cease to operate, the main capacitor CM2 and the voltage monitoring capacitor C61 are no longer fed.

The main capacitor CM2 connected across the output terminals J11 and J12 has a large capacitance as mentioned previously, and has a high value of discharge time constant unless the emission of flashlight is enabled, so that charge on the main capacitor CM2 is lost only at a very low rate. On the other hand, the capacitor C61 has a reduced capacitance, and the combined value of the resistors R61 and R62 is not high, so that the charge on the capacitor C61 discharges rapidly until the voltage thereacross decreases below the extinction level of the neon lamp NeII. Accordingly, the lamp NeII is extinguished, interrupting the base current to the switching transistors Q14 to Q54, which are therefore turned off. This allows a base current to be supplied to the oscillation transistors Q11 to Q51 through bias resistors R12 to R52, respectively, allowing the converters $DCC_{11}$ to $DCC_{15}$ to resume their oscillation.

As mentioned previously, the charge on the main capacitor CM2 is subject to little loss in the meantime while the voltage across the capacitor C61 reduces by an amount corresponding to a difference between the illumination level and the extinction level of the neon lamp NeII multiplied by a reciprocal of the voltage division ratio of the resistors R61 and R62. This can be mathematically expressed as follows:

$$Vc = \left(\frac{R61 + R62}{R62}\right) \times V_T$$

$$= \left(1 + \frac{R61}{R62}\right) \times V_T$$

$$Vc' = \left(1 + \frac{R61}{R62}\right) \times V_S$$

$$Vc - Vc' = \left(1 + \frac{R61}{R62}\right) \times (V_T - V_S)$$

where $V_T$ represents the illumination voltage of the neon lamp NeII, $V_S$ the extinction voltage of the neon lamp NeII, Vc the voltage across the capacitor C61 when the illumination voltage $V_T$ across the neon lamp NeII is reached and Vc' the voltage across the capacitor C61 when the extinction voltage $V_S$ across the neon lamp NeII is reached. The expression for (Vc−Vc') represents the voltage drop across the capacitor C61.

When resuming the oscillation of the converters $DCC_{11}$ to $DCC_{15}$, the capacitor C61 is charged supplementarily by an amount corresponding to the voltage drop (Vc−Vc'), and then the oscillation is again interrupted by disabling the converters $DCC_{11}$ to $DCC_{15}$. The described operation is repeated to maintain the voltage Vc across the main capacitor CM2, thus stabilizing the output voltage.

In a power supply unit as shown in FIG. 6 in which a plurality of converter circuits are connected in parallel to feed the main capacitor, it is necessary that the operation of all the converter circuits be simultaneously interrupted in a positive manner. One way to achieve this is to interrupt a small signal circuit with a current which is sufficiently high in comparison to the signal. As indicated in FIG. 6, in the arrangement of the invention, the base current of the oscillation transistors Q11 to Q51 is substantially equal to the current flow through the secondary winding S of the transformers T11 to T51 while the current flow through the neon lamp NeII when illuminated, or the base current to the switching transistors Q14 to Q54 is chosen so as to be sufficient to cause these switching transistors to conduct heavily. Since the emitter-base path of the oscillation transistors Q11 to Q51 is shunted by the collector-emitter path of the switching transistors Q14 to Q54, respectively, once the voltage across the collector and emitter of the switching transistor or across the emitter and base of the oscillation transistor begins to decrease, the feedback action which occurs cyclically causes the oscillation transistors to be driven toward the cut-off condition. In this manner, the cut-off or the interruption of the oscillating operation is achieved in a reliable manner.

As mentioned previously, either diode D61 or D62 may be dispensed with. However, in an external power supply arrangement which can be separated from other devices at the output terminals J11 and J12, it is preferred to include the diode D62 in order to prevent the voltage across the main capacitor CM2 from being directly exposed at the terminals. Alternatively, when an external power supply is connected to the output terminals J11 and J12 for purpose of feeding power, it is preferred to provide both diodes D61 and D62 to allow the feeding at the junction therebetween, thus conveniently preventing any interference between the power supplies.

Figure 7:
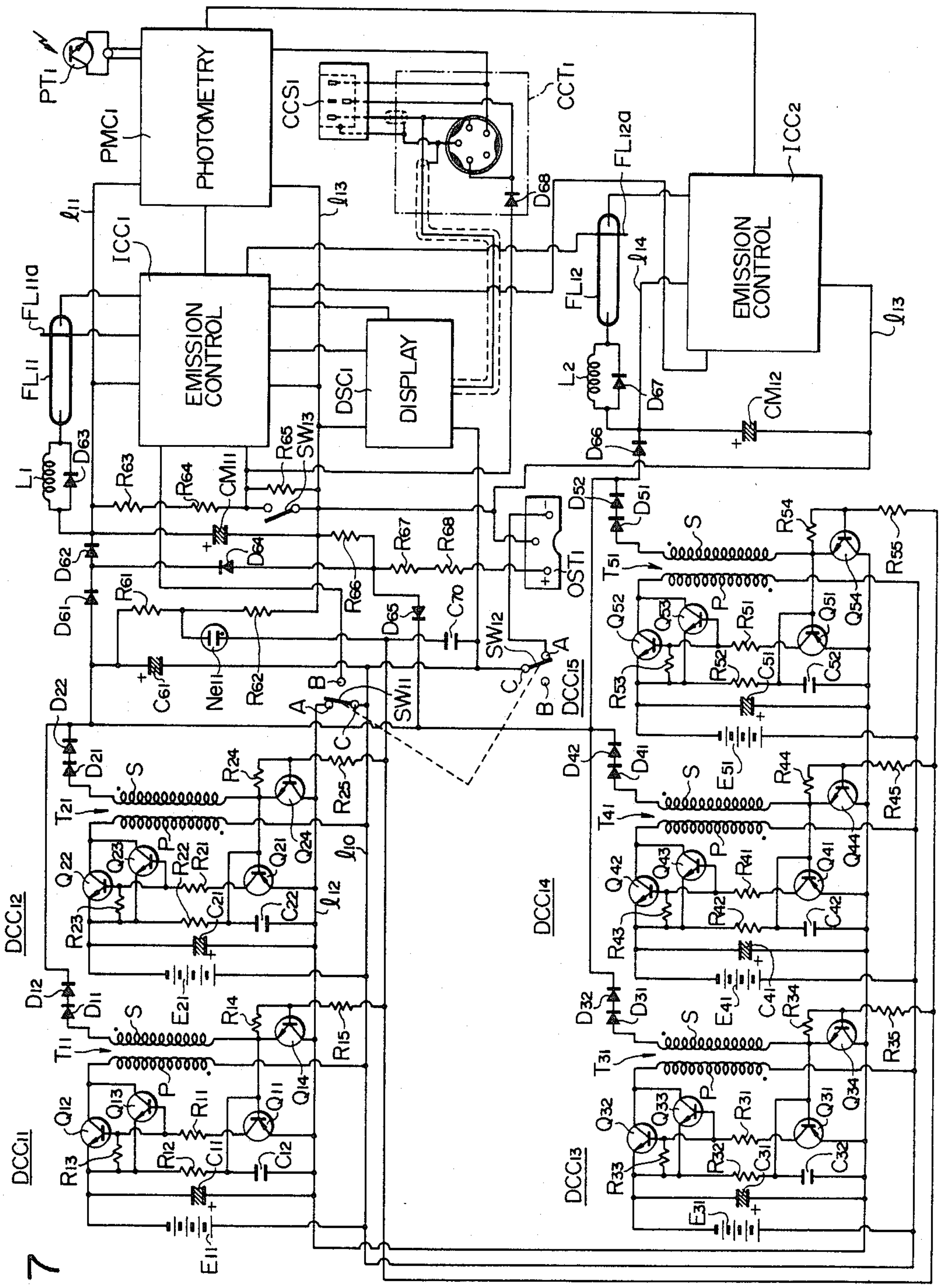
FIG. 7 is a circuit diagram of a power supply unit for electronic flash according to a further embodiment of the invention.

FIG. 7 is a circuit diagram of a power supply unit for electronic flash according to a further embodiment of the invention which is adapted to feed an electronic flash including a pair of flash discharge tubes. The power supply unit includes five DC-DC converters $DCC_{11}$ to $DCC_{15}$ connected in parallel to each other, in a manner similar to the embodiment shown in FIG. 6. Accordingly, similar parts as those shown in FIG. 6 are designated by like reference characters without repeating their description, and the following description will be limited only to the difference between the both embodiments.

As shown, a power switch SW11 is connected between the supply line $l_{12}$ and the common line $l_{10}$. The power switch SW11 in this configuration is formed by a changeover switch, with its movable contact C connected to the common line $l_{10}$ and one of its fixed contacts, A, connected to the supply line $l_{12}$. When the movable contact is thrown to the fixed contact A, an interconnection between the lines $l_{10}$ and $l_{12}$ is achieved through the switch SW11, feeding the individual DC-DC converters $DCC_{11}$ to $DCC_{15}$. The other fixed contact B of the switch SW11 is connected to one of emission control circuits, $ICC_1$, and when the movable contact is thrown to the fixed contact B, the converters $DCC_{11}$ to $DCC_{15}$ are no longer fed and therefore cease to operate while an emission inhibit signal is supplied to the emission control circuit $ICC_1$, thereby disabling the emission of flashlight from flash discharge tubes FL11 and FL12.

The power switch SW11 is mechanically interlocked with another power switch SW12, which is also formed by a changeover switch. The power switch SW12 includes a movable contact C which is connected to the common line $l_{10}$ and a fixed contact A which is connected to the negative terminal of an external power supply terminal OST1. The power switch SW12 has another fixed contact B which is left without connection. The positive terminal of the external power supply terminal OST1 is connected through a pair of resistors R68, R67 connected in series, to the anode of a diode D64, to the anode of a diode D65 and to one end of resistor R66. The cathode of the diode D64 is connected to the anode of the diode D62. The cathode of the diode D65 is connected to the anodes of diodes D61 and D66. The other end of resistor R66 is connected to a line $l_{13}$ which is connected to one end of each of main capacitors CM11 and CM12. The external power supply OST1 includes a common contact which is connected to the line $l_{13}$. Thus, when an external power supply such as a laminated battery pack is connected to the terminal OST1 and the power switch SW12 is thrown to the fixed contact A, the main capacitors CM11 and CM12 can be charged from the external power supply.

The cathode of the diode D62 is connected to a supply line $l_{11}$, and one emission control circuit $ICC_1$ is connected across the lines $l_{11}$ and $l_{13}$. It will be seen that a series circuit including a parallel combination of a coil L1 and diode D63 in series with the flash discharge tube FL11 is connected between the line $l_{11}$ and the emission control circuit $ICC_1$. A pair of lines $l_{14}$, $l_{13}$ are connected across the other main capacitor CM12, and the other emission control circuit $ICC_2$ is connected thereacross. It will be seen that a series circuit including a parallel combination of a coil L2 and diode D67 and the other flash discharge tube FL12 is connected between the line $l_{14}$ and the emission control circuit $ICC_2$. The flash discharge tubes FL11 and FL12 have trigger electrodes FL11*a* and FL12*a* which are connected to the first mentioned emission control circuit $ICC_1$ so as to initiate the emission of flashlight in response to an output from the emission control circuit $ICC_1$.

A series circuit including resistors R63, R64, and a trigger switch SW13, which is used to test the emission, is connected in shunt with the main capacitor CM11. The trigger switch SW13 is shunted by resistor R65, and the junction between resistor R64 and the switch SW13 is connected to the emission control circuit $ICC_1$ and also connected through diode D68 to a connector $CCT_1$ and a contact assembly $CCS_1$ for connection with a camera. Accordingly, the emission control circuit $ICC_1$ is triggered by a signal from the camera or in response to the closure of the switch SW13 to initiate the emission of flashlight from flash discharge tubes FL11, FL12.

A display circuit $DSC_1$ operates to indicate the completion of a charging operation or an automatic emission control within the electronic flash or camera, and is connected to the contact assembly $CCS_1$ and the connector $CCT_1$ through a shielded cable. The display circuit $DSC_1$ is fed with power from the emission control circuit $ICC_1$.

A photometric circuit $PMC_1$ is connected across the lines $l_{11}$ and $l_{13}$. The photometric circuit $PMC_1$ is connected with a photoelectric transducer element PT1 for integrating a photocurrent produced by the transducer element PT1 to develop an automatic emission control signal when a given exposure level is reached, which is supplied to the emission control circuits $ICC_1$ and $ICC_2$. The photometric circuit is also connected with the contact assembly $CCS_1$ or connector $CCT_1$ to receive a signal from the camera so as to develop an automatic emission control signal in accordance therewith which is supplied to the emission control circuits $ICC_1$ and $ICC_2$.

The power supply unit of the present invention operates in substantially the same way as that illustrated in FIG. 6. Specifically, when the power switch SW11 is thrown to the fixed contact A, each of the converters $DCC_{11}$ to $DCC_{15}$ is fed from the respective d.c. sources E11 to E51 through the supply line $l_{12}$, thus beginning to operate. When the voltage across the main capacitors CM11, CM12 reaches a given value, the neon lamp Nell is illuminated, and the resulting current turns the switching transistors Q14 to Q54 on, thus ceasing the operation of the converters $DCC_{11}$ to $DCC_{15}$. The subsequent operation remains quite the same as the power supply unit shown in FIG. 6.

Figure 1:
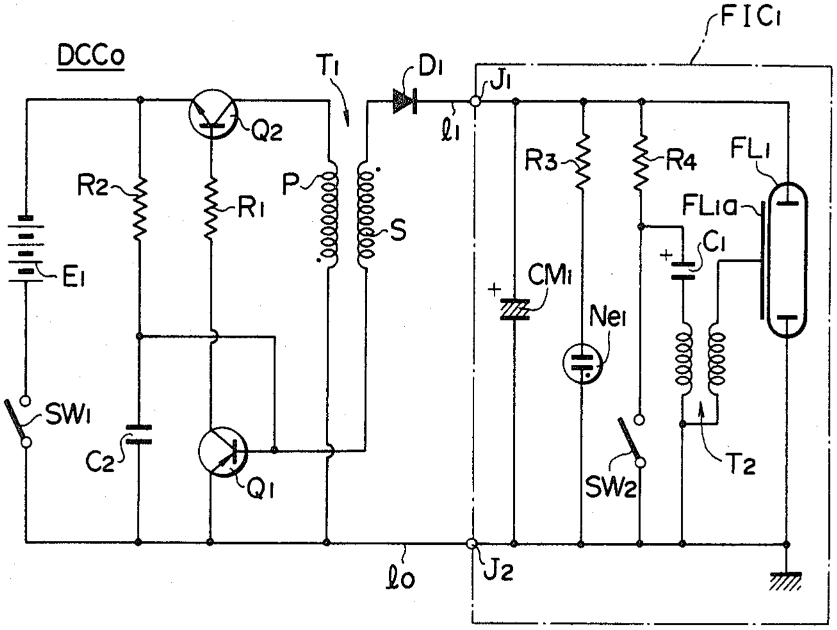
FIG. 1 is a circuit diagram of an example of a conventional power supply unit for electronic flash.
Figure 2:
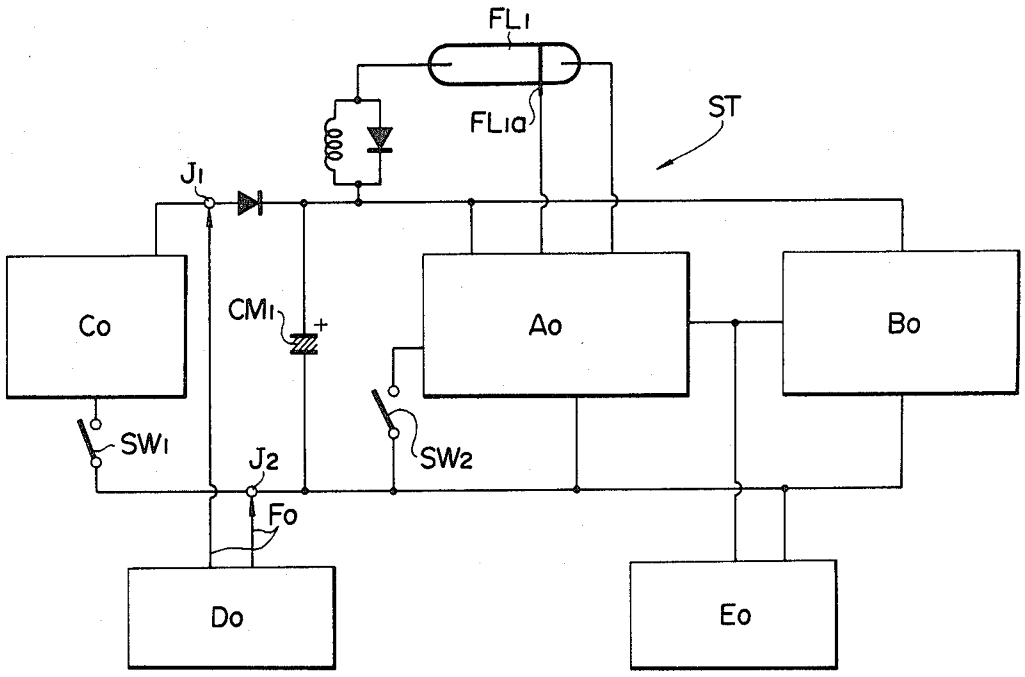
FIG. 2 is a block diagram of a conventional electronic flash, illustrating the general arrangement.
Figure 3:
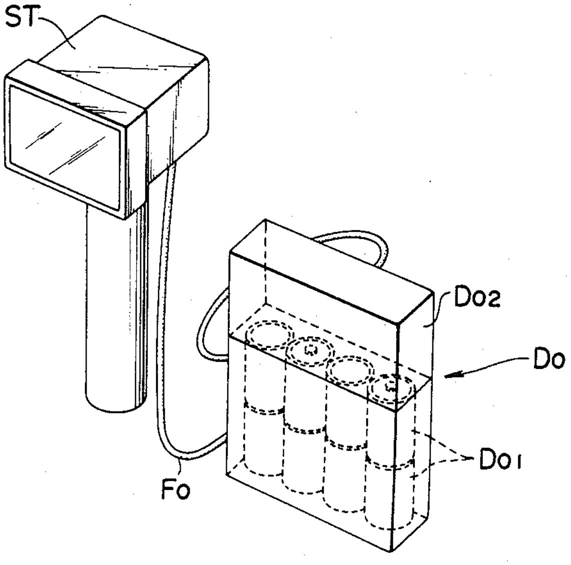
FIG. 3 is a perspective view of the electronic flash shown in FIG. 2.
Figure 8:
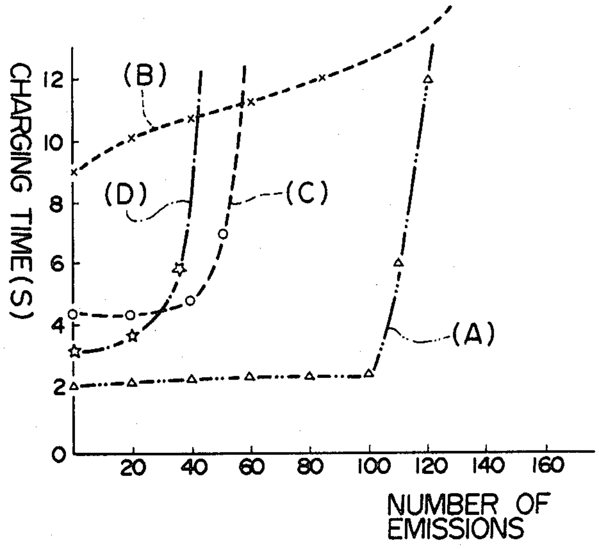
FIG. 8 graphically illustrates the response of the power supply unit shown in FIG. 7 in comparison to the response of the conventional power supply unit shown in FIG. 1.

FIG. 8 graphically compares the charging time (S) and the number of emissions between the power supply unit shown in FIG. 7 and conventional power supply units as shown in FIG. 1. A curve (A) shown in double dot chain line is representative of the response of the power supply unit of the invention while curves (B), (C) and (D) are representative of the responses of conventional power supply units. As described previously, the power supply unit of FIG. 7 utilizes twenty nickel-cadmium batteries of UM-3 type. By contrast, the power supply unit illustrated by the curve (B) utilizes eight alkali batteries of UM-1 type, equivalent in capacity to forty to forty-eight UM-3 type batteries. The power supply unit illustrated by the curve (C) utilizes eight nickel-cadmium batteries of UM-1 type, equivalent in capacity to forty to forty-eight UM-3 type batteries, and the power supply unit illustrated by the curve (D) utilizes eight nickel-cadmium batteries of UM-2 type, equivalent in capacity to twenty-four UM-3 type batteries.

It will be seen that the power supply unit utilizing alkali cells and illustrated by the curve (B) requires an increased length of charging time, and thus is unsuitable for use with a large size electronic flash which may be used by a press photographer and which requires a rapid operation. The power supply unit utilizing nickel-cadmium cells and illustrated by the curve (C) have a battery capacity which is twice as great as that of the power supply unit of the invention illustrated by the curve (A). However, its response indicates that such power supply unit is inferior to the power supply unit of the invention in respect of both the charging time and the number of emissions. The power supply unit utilizing nickel-cadmium cells and illustrated by the curve (D) has a battery capacity which corresponds to that of the power supply unit of the invention, but requires a charging time which is as long as 150% of the charging time of the invention and yields a number of emissions which is on the order of 40% as compared with the invention. In total, the performance of the power supply unit illustrated by the curve (D) will be on the order of 30 to 40% as compared with the power supply unit of the invention. However, in the power supply unit of the invention as illustrated by the curve (A), a plurality of DC-DC converters are connected in parallel so as to reduce the discharge current from each source battery, thereby achieving an effective utilization of the active material in the plates of the battery, thus attaining a considerable improvement in respect of the charging time and the number of emission.

Figure 9:
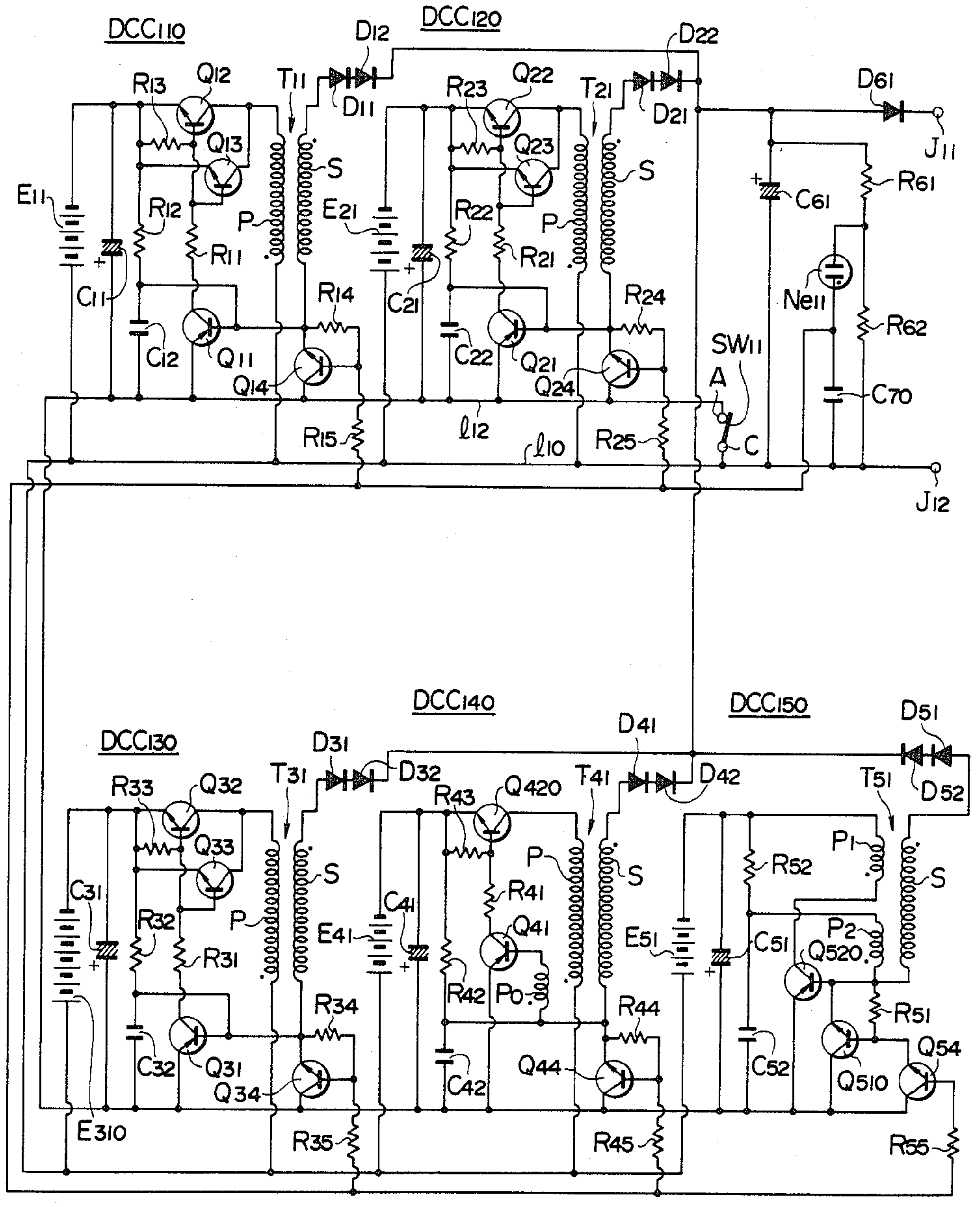
FIG. 9 is a circuit diagram of a power supply unit for electronic flash according to still another embodiment of the invention.

FIG. 9 is a circuit diagram of a power supply unit for electronic flash according to still another embodiment of the invention. This embodiment is constructed as an external power supply unit for external connection to an electrical circuit including a flash discharge tube or tubes and a flashlight emission circuit. The circuit arrangement includes five DC-DC converters DC110 to $DCC_{150}$ connected in parallel across output terminals J1 and J2, in a manner similar to the embodiment shown in FIG. 6. Accordingly, similar parts as shown in FIG. 6 are designated by like reference characters without describing them specifically. Thus only the difference will be described.

Of DC-DC converters $DCC_{110}$ to $DCC_{150}$, which form five charging units, two converters $DCC_{110}$ and $DCC_{120}$ including the source batteries E11, E21 and booster circuits are constructed in quite the same manner as the converters $DCC_{11}$ to $DCC_{15}$ shown in FIG. 6. Converter $DCC_{130}$ differs in the capacity of the battery E310. Specifically, the battery E310 is designed to produce a supply voltage which is different from that produced by the remaining converters $DCC_{110}$, $DCC_{120}$, $DCC_{140}$ and $DCC_{150}$, with a corresponding change in the converter circuit which is designed to operate on the different voltage.

Converter $DCC_{140}$ includes a battery E41 which is similar to that used in the converters $DCC_{110}$ and $DCC_{120}$. However, it includes a main transistor Q420 of an increased capacity which is substituted for the pair of transistors Q12 and Q13 or Q22 and Q23. It includes a step-up transformer T41 which additionally comprises an oscillation winding $P_0$. Converter $DCC_{140}$ operates substantially in the same manner as the converters $DCC_{110}$, $DCC_{120}$ and $DCC_{130}$, and hence will not be described.

Converter $DCC_{150}$ includes a step-up transformer T51 having a pair of oscillation windings P1 and P2 having their one end connected to the collector of a main transistor Q520 of PNP type and to the emitter of an oscillation transistor Q510 of NPN type and having their other ends connected together through a load resistor R51 interposed therebetween. In other respects, the arrangement is similar to the remaining converters. The operation of converter $DCC_{150}$ is substantially similar to the operation of the remaining converters $DCC_{110}$ to $DCC_{140}$, and therefore will not be described.

As illustrated, the source batteries and the converter circuits which form a plurality of charging units of the invention need not be of a same capacity or of a same construction.

A flashlight emission circuit which is connected to the power supply unit of the invention may be constructed in any desired manner, provided it lends itself to a satisfactory operation with the power supply unit, and hence will not be described in detail.

In the described embodiments, four or five DC-DC converters have been provided and connected in parallel, but it should be understood that the number of converters used may be suitably chosen depending on the capacitance and the number of main capacitors to be charged.

What is claimed is:

1. A power supply unit for electronic flash comprising:
   - a plurality of charging units each including a separate D.C. source and a DC/DC converter for providing a booster action upon the voltage of the source, each of the charging units being operative to charge a main capacitor of an electronic flash; and
   - a plurality of diodes connected between each of the charging units and the main capacitor for directly connecting each charging unit to the main capacitor while preventing a reverse current flow from the main capacitor to each of the charging units.

2. A power supply unit for electronic flash comprising:
   - a plurality of charging units each including a separate d.c. source and a DC/DC converter for providing a booster action upon the voltage of the source, each of the charging units being operative to charge a main capacitor of an electronic flash;
   - a plurality of diodes connected between each of the charging units and the main capacitor for preventing a reverse current flow from the main capacitor to each of the charging units; and
   - a power switch for simultaneously enabling the operation of all of the charging units.

3. A power supply unit for electronic flash comprising:
   - a plurality of charging units each including a d.c. source and a converter for providing a booster action upon the voltage of the source, each of the charging units being operative to charge a main capacitor of an electronic flash;
   - a plurality of diodes connected between each of the charging units and the main capacitor for preventing a reverse current flow from the main capacitor to each of the charging units;
   - charging voltage detecting means for determining if the main capacitor has been charged to a given value; and
   - a plurality of disable means in each of the charging units and responsive to an output from the charging voltage detecting means to cease the operation of the respective charging units simultaneously.

4. A power supply unit according to claim 1, in which each d.c. source has an equal voltage and an equal capacity.

5. A power supply unit according to claim 1, in which at least one of said d.c. sources has a voltage or capacity which is different from the voltage or capacity of the remaining d.c. sources.

6. A power supply unit according to claim 1, in which said converters are identical to one another.

7. A power supply unit according to claim 1, in which at least one of said converters is constructed differently from the remaining converters.

8. A power supply unit according to claim 1, in which each of the diodes also serves as a rectifier in the associated charging unit.

9. A power supply unit according to claim 1, further including a pair of output terminals which are adapted to be externally connected to an associated electronic flash.

10. A power supply unit according to claim 3 in which the charging voltage detecting means comprises an output voltage monitoring capacitor which is adapted to be charged to the same voltage level as the main capacitor, and a voltage detecting neon lamp.

11. A power supply unit according to claim 10 in which a discharge current from the neon lamp represents an output from the charging voltage detecting means.

12. A power supply unit according to claim 3 in which the disable means comprises a switching transistor which disables the operation of the converter.

13. A power supply unit according to claim 2, in which each d.c. source has an equal voltage and an equal capacity.

14. A power supply unit according to claim 3 in which each d.c. source has an equal voltage and an equal capacity.

15. A power supply unit according to claim 2, in which at least one of said d.c. sources has a voltage or capacity which is different from the voltage or capacity of the remaining d.c. sources.

16. A power supply unit according to claim 3, in which at least one of said d.c. sources has a voltage or capacity which is different from the voltage or capacity of the remaining d.c. sources.

17. A power supply unit according to claim 2, in which said converters are identical to one another.

18. A power supply unit according to claim 3, in which said converters are identical to one another.

19. A power supply unit according to claim 2, in which at least one of said converters is constructed differently from the remaining converters.

20. A power supply unit according to claim 3, in which at least one of said converters is constructed differently from the remaining converters.

21. A power supply unit according to claim 2, in which each of the diodes also serves as a rectifier in the associated charging unit.

22. A power supply unit according to claim 3, in which each of the diodes also serves as a rectifier in the associated charging unit.

23. A power supply unit according to claim 2, further including a pair of output terminals which are adapted to be externally connected to an associated electronic flash.

24. A power supply unit according to claim 3, further including a pair of output terminals which are adapted to be externally connected to an associated electronic flash.

25. A power supply unit for an electronic flash comprising:

a plurality of individual charging units each comprising a d.c. source and d.c./d.c. converter means for boosting the voltage of said d.c. source;

a main capacitor for an electronic flash;

a plurality of diode means each connecting the output of the d.c./d.c. converter of its associated charging unit to said main capacitor, said diodes being poled to prevent reverse current flow from said capacitor to said charging units and for preventing a reverse current flow from any one of said charging units to another one of said charging units;

switch means having a first position for simultaneously coupling the d.c. source of each converter to its d.c./d.c. converter and having a second position for decoupling each d.c. source from its associated d.c./d.c. converter.

* * * * *

UNITED STATES PATENT AND TRADEMARK OFFICE

CERTIFICATE OF CORRECTION

PATENT NO. : 4,530,550

DATED : July 23, 1985

INVENTOR(S) : Isao Kondo

It is certified that error appears in the above-identified patent and that said Letters Patent is hereby corrected as shown below:

Column 2, line 42 delete "the".

Column 4, line 21 change "boosterconverter" to --booster-converter--.

Column 7, line 22 delete "v.".

Signed and Sealed this

*Third* Day of *December 1985*

[SEAL]

*Attest:*

DONALD J. QUIGG

*Attesting Officer* *Commissioner of Patents and Trademarks*